March 1, 1966    R. P. BALLOU    3,238,518
DUAL MODE INDICATOR DEVICE
Filed Aug. 29, 1962

INVENTOR.
Richard P. Ballou
BY
Paul J. Ethington
ATTORNEY

United States Patent Office 3,238,518
Patented Mar. 1, 1966

3,238,518
DUAL MODE INDICATOR DEVICE
Richard P. Ballou, Howell, Mich., assignor to General Motors Corporation, Detroit, Mich., a corporation of Delaware
Filed Aug. 29, 1962, Ser. No. 220,273
6 Claims. (Cl. 340—181)

This invention relates to electrical indicating means for monitoring the conditions at the plurality of remote points. More specifically, the invention presents a combination of an electromagnetic gauge circuit normally operative in a primary mode to indicate a first condition, and a condition responsive circuit for actuating a secondary mode of indicator operation in response to a second condition.

In the present invention the primary mode of displaying information pertaining to a condition to be monitored at a remote point is implemented in a conventional electromagnetic gauge employing flux producing coils which are adapted to influence the angular displacement of a rotatable armature. The secondary mode of displaying information is implemented in a current-sensitive warning device adapted to provide a plurality of warning states in accordance with the magnitude of current flowing therethrough, the warning states being controlled by a plurality of conditions also being monitored.

Through the inventive combination of the first and second modes of displaying information as herein disclosed, a complementary method of indicating a mechanical failure of one of the indicating modes is provided. Another feature of the combination is that it makes it unnecessary to provide additional circuitry for making periodic checks of the operating condition of the indicating means. An additional feature of the invention is that it contributes to the longevity of the secondary indicating means by reducing the effect of energy surges which are normally associated with emergency warning devices.

In a particular embodiment of the invention the secondary mode of displaying information is so associated with the primary mode that the normal operation of the primary mode, that being the electromagnetic gauge, is discontinued in the event the secondary information becomes critical. Under these circumstances, the normally secondary information is given priority over the primary information to indicate that an emergency condition is imminent. Under the emergency conditions, both the primary and secondary modes are cooperative to indicate the emergency condition. Additionally, means are provided to restore the gauge circuit to normal operation once the emergency condition has been acknowledged.

Briefly describing the circuit construction of the invention, a closed series circuit is provided by the combination of an electromagnetic deflecting coil which is effective to produce a flux field in accordance with the current through it, a source of energizing potential to produce the necessary gauge current, and a current responsive warning device, such as an indicator lamp, connected between the source and the coil. The indicator lamp is current-sensitive to the extent that the normal gauge current which flows from the source as a result of the combined series resistance of the gauge coil and the lamp energizes the lamp to a low level of illumination usually below visibility. The secondary mode is provided by means of an auxiliary circuit interconnecting the source and the indicator lamp, such that upon closure of a condition-sensitive switch in the auxiliary circuit, the gauge coil is connected in shunt relation with the auxiliary circuit. When the switch is closed, current through the lamp from the source is provided with the low resistance path provided by the parallel combination of the coil and auxiliary circuit such that the resultant current through the lamp exceeds that current which normally flows through the coil. The current through the lamp is then greatly increased to energize the lamp to a visible level of illumination.

An understanding of the present invention may be more readily acquired by reference to the following specification taken with the accompanying drawings which are illustrative of several embodiments of the present invention. In the drawings.

Figure 1:
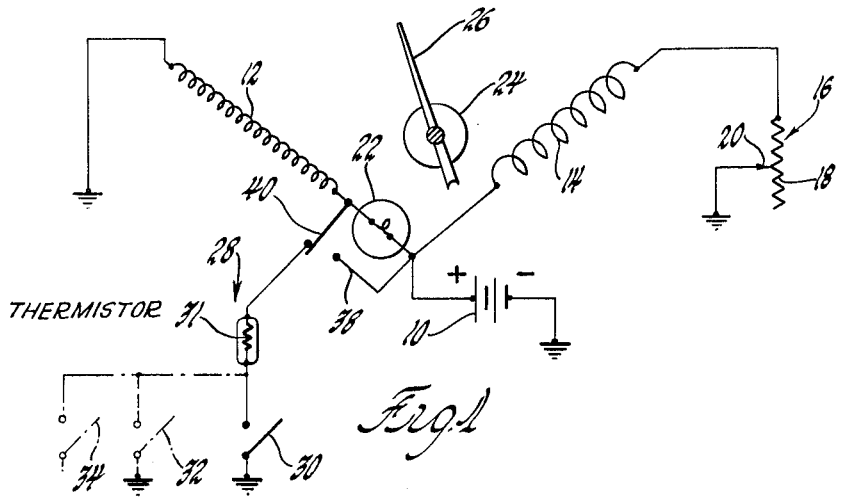
FIGURE 1 is a schematic diagram of a one-wire electromagnetic gauge employing the present invention.

Referring now to FIGURE 1, the invention is shown incorporated into a one-wire electromagnetic gauge circuit normally operative to provide a constant indication of a remote condition. The basic gauge circuit comprises a source of potential such as a battery 10 having the negative terminal thereof grounded as shown and the positive terminal connected to one side of each of a pair of coils 12 and 14 which are relatively disposed with the magnetic axes thereof separated by a predetermined angle. Coil 12, which is a relatively high resistance coil, has the other side thereof connected to ground such that the coil is effectively connected across the battery 10 thereby to provide a constant electromagnetic field. Coil 14, which is a relatively low resistance coil, has the other side connected to a current regulator sender unit 16 comprising a resistor 18 and a movable grounded contact 20. The movable contact 20 is adapted to be displaced along the resistor 18 in response to a changing condition such as liquid level. It is to be understood that the sender 16 may also be responsive to other conditions such as temperature and pressure through the incorporation of a suitable transducer. Connected in series between the battery 10 and coil 12 there is shown an indicator lamp 22. It can be seen that a series current path is provided from the positive terminal of battery 10 through lamp 22, and coil 12. The series circuit is completed back to the negative terminal of battery 10 by means of the mutual ground connection of coil 12 and the battery 10. It can be seen that there will normally be a small current flowing through the high resistance combination of coil 12 and lamp 22. This current is not sufficient to produce a distinctly visible glow from the lamp 22.

The primary mode of displaying the information transmitted from the sender unit 16 is accomplished by means of a permanent magnet armature 24 which is rotatably mounted in magnetic proximity to the coils 12 and 14. Attached to the armature 24 and rotatable therewith is an indicator such as a pointer 26. The gauge circuit shown in FIGURE 1, exclusive of the lamp 22, is a conventional one-wire gauge often used to monitor the level of gasoline in an automobile.

Briefly describing the operation of such a gauge, coil 12 provides a reference electromagnetic flux field which tends to align the permanent magnet armature 24 therewith. Coil 14, suitably coupled with the current-regulating means in the form of sender unit 16, provides a variable magnitude flux field which varies in response to the conditions to be indicated. Superimposing the flux fields created by coils 12 and 14 produces a resultant flux field which varies in direction between the axes of the coils 12 and 14. The permanent magnet armature 24 is aligned with the resultant flux field to provide the indication of the conditions affecting the resistance of the sender unit 16.

Continuing with the description of the circuit of FIGURE 1, low resistance auxiliary circuit means, generally designated at 28, are connected on one side to the junction between lamp 22 and coil 12 and on the other side through a switch 30 to ground. The switch 30 is responsive to a preselected remote condition to close thereby providing a low resistance current path through the auxiliary circuit means 28 which is in shunt relation to the high resistance coil 12. With switch 30 closed, current from the battery 10 is provided with a low resistance current path from the positive terminal of battery 10, through lamp 22, through the auxiliary circuit means 28, including the closed switch 30, and back to the negative terminal of battery 10 via the ground connection. It can be seen that when switch 30 is closed, the current normally flowing through coil 12 is greatly reduced whereas current flow through lamp 22 is greatly increased with a corresponding change in the level of illumination of the lamp 22. If the condition which is effective to close switch 30 is of a spurious nature, it may be desirable to prevent an indication thereof until the condition persists for a predetermined time. This delay can be provided by the series connected negative temperature coefficient resistance means thermistor 31.

As shown in FIGURE 1, a plurality of switches such as 32 and 34 may also be connected in parallel with switch 30 and be responsive to additional conditions to provide the low resistance current path through the auxiliary circuit means 28. It should be noted that the circuitry of FIGURE 1 does not comprise a warning system in which the lamp 22 is energized at a predetermined gauge reading. On the contrary, the condition or source of information which controls the resistance of the sender unit 16 may be distinct from the conditions which serve to actuate any of the switches 30, 32 or 34. It is, however, expected that under normal conditions that source of information which regulates the series resistance of the sender unit 16 will be considered of primary importance and in need of constant monitoring by means of the gauge circuit and the indicator pointer 26. Under these conditions the sources of information which serve to effect the open or closed condition of the switches 30, 32 or 34 are of such a nature as to be termed of secondary importance. That is, they do not require constant monitoring over a variable range, but need only be positively indicated when the conditions correspond with a predetermined critical status.

Figure 4:
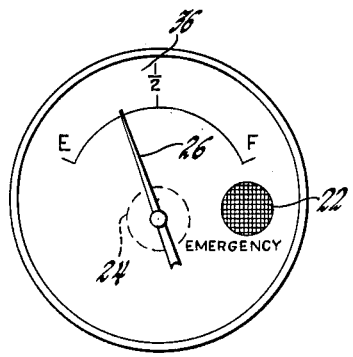

To illustrate the statements above, the normal function of the gauge which provides a reading via the pointer 26 may be to monitor the amount of gasoline in the automobile tank. In this case, a suitable float-actuated system will be provided to displace the contact 20 of the sender unit 16 in accordance with changes in the gasoline level. As shown in FIGURE 4, the pointer 26 is angularly displaced over a dial face 36 between the empty and full positions to constantly indicate the amount of gasoline. Switch 30, however, may be responsive to a potential emergency condition such as low oil pressure. The modern automobile operator does not find it necessary to be provided with a constant indication of the oil pressure, but must be provided with a positive indication in the event that the oil pressure falls below a predetermined critical level. Since an unusual drop in oil pressure may eventually result in the loss of an entire engine, it then becomes imperative to provide a positive indication which will notify the driver of the emergency condition. Switches 32 and 34 may similarly be responsive to potential emergency conditions which are not normally monitored but must be positively indicated whenever the emergency condition arises. Examples of such conditions are coolant temperatures, bearing temperatures, and so forth. It is understood that choice of conditions to be termed primary and secondary is not limited to the example above, but may be left to the discretion of the design engineer.

Considering the operation of the circuit of FIGURE 1 in greater detail, assume for the sake of simplicity that only switch 30 is present. Switch 30, as previously indicated, may be a thermostat, a pressure switch, a flow switch or any other type of circuit closing device which is responsive to the type of emergency condition to be indicated. Upon closure of switch 30 the low resistance of the auxiliary circuit means 28, which is in parallel or shunt relation to the coil 12, will effectively short out coil 12 once the thermistor 31 has heated sufficiently. The current path between the positive and negative terminals of the battery 10 then comprises the series combination of lamp 22 and the auxiliary circuit means 28. Prior to the closing of switch 30 the current produced by the voltage from battery 10 was, of course, limited by the total series resistance of the combination of lamp 22 and coil 12. Thus, it is apparent that due to the decreased resistance upon closure of switch 30, the current through lamp 22 will be substantially increased. The lamp 22 is thus a current-sensitive device which, during normal gauge operation, is energized to a low level of illumination preferably below visibility. But upon closure of switch 30, the increased current increases the energization of the lamp to a high level of illumination. Thus, the different levels of illumination of lamp 22 provide a first indication of the emergency condition to which switch 30 is responsive.

In addition to increasing the level of illumination of lamp 22, shunting the current normally flowing through coil 12 also affects the resultant flux field which positions the permanent magnet armature 24 and the attached pointer 26. With coil 12 short circuited only the flux from coil 14 acts upon the armature 24. Thus, the pointer 26 is automatically and immediately displaced to a predetermined emergency position upon the closing of switch 30. This emergency position is determined by the magnetic axis of coil 14. As indicated in FIGURE 4, this position may correspond to the location of lamp 22 in the dial face 36. Thus, a second means of calling attention to the emergency condition is provided.

As seen above, under normal conditions of gauge operation, the lamp 22 is constantly energized by the current through gauge coil 12. This gauge current normally energizes lamp 22 to a low level of illumination. The definite advantage of this constant energization is that the life of lamp 22 is greatly increased due to the decreased effect of thermal shock caused by the normal instantaneous energization of lamps which takes place in conventional indicator light circuits. One example of such a circuit is the high water temperature lamp now present in most automobiles. Additionally, the conventional circuits require a testing arrangement associated with the automobile ignition switch to check the condition of the lamp each time the ignition is turned on. It can be seen that the present invention does away with the necessity for such an auxiliary testing circuit and also provides a more reliable indication of the condition of lamp 22 while extending the life thereof.

In the event that lamp 22 does eventually burn out, it can be seen that again coil 12 will be disconnected from the battery 10. Under these conditions, the pointer 26 will swing to the emergency condition on the dial face 36 to indicate that the bulb is either burned out or has loosened in its socket. Therefore, the present invention has provided a lamp test circuit which is much simpler and less expensive than the conventional test circuit indicated above.

Since the operation of the gauge is discontinued when the lamp 22 burns out, means are provided to restore the gauge to normal operation until the lamp 22 may be replaced. This means takes the form of a by-pass conductor 38 and a pushbutton switch 40 which may be located on the vehicle dashboard. When the pushbutton switch 40 contacts conductor 38, a circuit is completed around the lamp 22 such that normal gauge operation may once again be resumed. The circuit, as shown, not only by-passes the lamp 22, but also disconnects the secondary warning means 28. Obviously, the circuit may be arranged to by-pass a burnt out lamp without disconnecting the secondary warning system.

Figure 2:
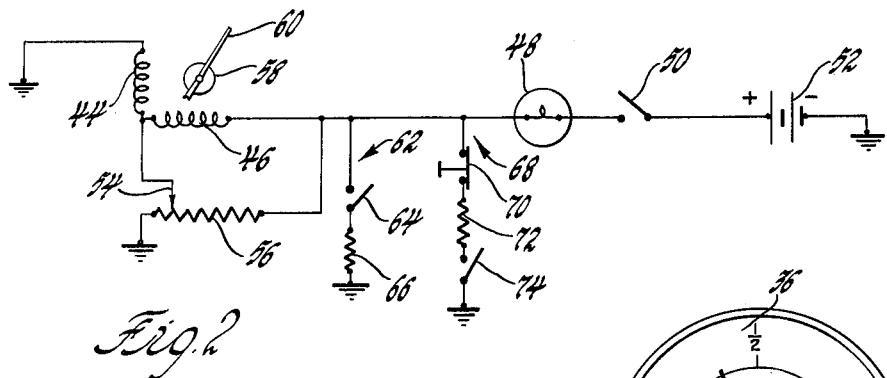
FIGURE 2 is a schematic diagram of a two-wire electromagnetic gauge employing an alternative form of the present invention.

Reference to FIGURE 2 shows the invention as incorporated with a two-wire gauge circuit. The two-wire gauge again comprises a pair of electromagnetic coils 44 and 46, which are mutually connected on one side and have the magnetic axes thereof separated by a predetermined angle. The other side of coil 44 is connected to ground as shown, and the other side of coil 46 is serially connected through a lamp 48 and an ignition switch 50 to the positive terminal of a battery 52. The negative terminal of the battery 52 is grounded as shown. The connection point between coils 44 and 46 is connected to a movable contact 54 which is adapted to be displaced along a sender resistor 56 which is connected between the other side of coil 46 and ground to form a current regulating potentiometer. The resultant of the flux field produced by coils 44 and 46 is effective to align the rotatably mounted magnetic armature 58 and the pointer 60 which is connected thereto.

Briefly considering the operation of the gauge, it can be seen that with the movable contact 54 in the extreme righthand position on resistor 56 as shown in the drawings, the coil 46 will be short-circuited and the bulk of the voltage of battery 52 will appear across coil 44. However, with the contact 54 in the extreme lefthand position on resistor 56 as shown in the drawings, it can be seen that both ends of coil 44 are connected to ground. Thus, the voltage of the battery 52, exclusive of the small drop across the lamp 48, will appear across coil 46. At any intermediate position of the contact 54 the coils 44 and 46 will be differentially energized and the magnetic armature 58 will at all times be aligned with the resultant flux field.

Connected intermediate coil 46 and lamp 48 is a first shunt circuit 62 which includes a normally opened switch 64. The switch 64 is, however, responsive to a particular condition to close thereby completing a low resistance circuit from the positive terminal of battery 52 through the ignition switch 50, the lamp 48 and the shunt circuit 62 back to the negative terminal of the battery 52. This circuit is in shunt relation to the remainder of the indicator circuit including coil 46. Note that the shunt circuit 62 may ordinarily include a small current limiting resistor 66. The resistor 66 may also be a thermistor to provide a delay suitable for eliminating spurious lighting of lamp 48. Also connected intermediate coil 46 and lamp 48 is a second shunt circuit 68. The shunt circuit 68 comprises a pushbutton switch 70, a small resistor 72 and a normally open switch 74. It should be noted that the shunt circuits 62 and 68 correspond with the auxiliary circuit means 28 of FIGURE 1 which includes the plurality of normally open switches 30, 32 and 34.

Considering the operation of the circuit of FIGURE 2 under normal conditions, switches 64 and 74 will be open and the ignition switch 50 will be closed. The current available from the battery 52 will flow through the lamp 48 and will be limited by the minimum resistance of the gauge circuit. This minimum resistance will correspond to the resistance of either coil 44 or 46, in parallel with sender resistance 56. Under these conditions, the current through lamp 48 will energize the lamp to a low level of illumination. However, should either switch 64 or 74 close, the low resistance current path provided through shunt circuit 62 or 68 will greatly increase the current through lamp 48, thus, energizing the lamp to a high level of illumination. Since the provision of two shunt switches introduces an ambiguity in the emergency condition as indicated by lamp 48, the normally closed pushbutton switch 70 is provided. By momentarily opening the switch 70 it will immediately be apparent which of the shunt circuits has been completed.

It should be noted that the current limiting resistors indicated at 66 and 72 of the shunt circuits 62 and 68 will effect a current distribution between the completed shunt circuit and the gauge circuit. Thus, closure of either switch 64 or 74 does not normally discontinue the operation of the gauge. The gauge may continue to operate since it is not dependent upon the absolute value of the coil currents, but upon the relative value as between the coils. However, should the lamp 48 burn out or loosen in its socket, the operation of the gauge will be immediately discontinued since the battery 52 is disconnected from either of the coils 44 or 46. In this manner, the condition of the lamp 48 is indicated by the discontinuity in the operation of the gauge.

Figure 3:
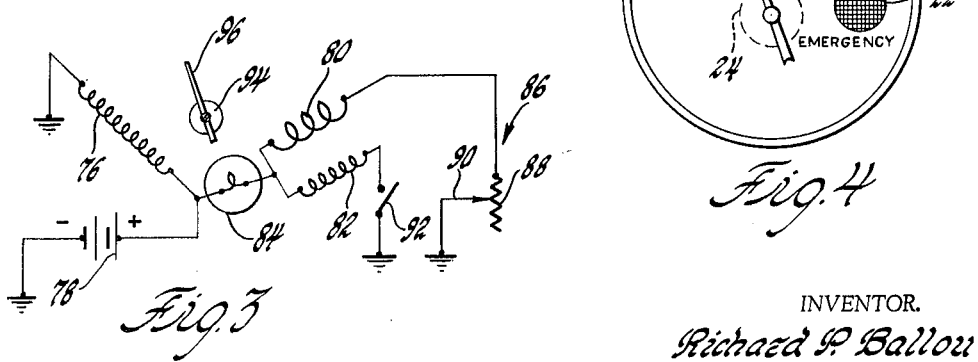
FIGURE 3 is a schematic diagram of a modified form of the present invention as applied to a one-wire electromagnetic gauge; and, FIGURE 4 is an example of the appearance of a gauge face for properly displaying the information obtained from the primary and secondary modes.

Referring to FIGURE 3, there is shown a modification of the basic two-wire gauge circuit of FIGURE 1. In this figure a first gauge coil 76 is connected across a battery 78 as shown. Second and third gauge coils 80 and 82 respectively have one side mutually connected through a lamp 84 to the positive terminal of the battery 78. The other side of coil 80 is connected through a sender unit 86 which comprises a fixed resistor 88 and a variable position grounded contact 90. The position of the contact member 90, and, thus, the resistance connected in series with coil 80 is determined by a first condition which is normally monitored by the gauge circuit. The other side of coil 82 is connected through a normally open switch 92 to ground as shown, and, thus, is effectively connected to the negative terminal of the battery 78.

Since the switch 92 is normally opened, coil 82 will not effect the operation of the gauge. The angular position of a rotatably mounted permanent magnet armature 94 will then be effected by the distribution of current through the coils 76 and 80. As previously mentioned, the resultant flux field will vary in its angular position as the current through coil 80 is varied by means of the sender unit 86.

Switch 92 is responsive to a second condition to be monitored and will close when the second condition reaches a critical value. The resistances of coils 80 and 82 are selected such that the resistance of coil 82 is substantially less than the resistance of coil 80. Thus, when switch 92 is closed, a low resistance path is provided from the positive terminal of battery 78 through lamp 84, coil 82 and the switch 92. The series combination of coil 82 and switch 92 is in shunt relation to the series combination of coil 80 and the sender unit 86. Because of the lower resistance of the current path provided by the closure of switch 92, the current through the lamp 84 will also be substantially increased over that current which is normally flowing with switch 92 open and the difference in brilliancy of the lamp 84 will indicate the emergency condition, as in the circuits of FIGURES 1 and 2. Additionally, the current through coil 82 will provide an additional bias on the permanent magnet armature 94 which will tend to align the attached pointer 96 with the axis of coil 82. This is to be compared with the result of an open circuit due to lamp 84 either burning out or loosening in its socket. Under these last mentioned conditions, both coils 80 and 82 are disconnected from the battery 78 and the coil 76 provides the only flux bias on the armature 94. Under these conditions the pointer 96 aligns with coil 76. As shown in the drawings, the circuit of FIGURE 3 provides a means whereby the pointer 96 will move to the extreme left if the lamp 84 burns out but will move to the right if switch 92 closes.

It is to be understood that, although several modifications of the basic invention have been shown and described herein, these are not to be construed in a limiting sense but are only exemplary of the many modifications which are possible to the present invention. For example, suitable flasher circuits may be incorporated with the emergency warning lamps to provide a flashing indication if desired. Additionally, the emergency warning circuit may be extended to more elaborate configurations, including more than one lamp in more than one arm of the gauge circuit. The basic invention may also be applied to a gauge circuit having more than two coils, as has been shown herein. Many embodiments of the present invention will undoubtedly be apparent to one skilled in the art, and for a definition of the invention, reference should be had to the appended claims.

What is claimed is:

1. Dual mode indicator means of the class described including the circuit combination of a source of energizing potential, first and second gauge coils connected across said source, continuously variable potentiometer means connected to said first coil and responsive to a first condition to vary the current through said first coil, a current responsive warning means connected in series with said second gauge coil, said current responsive warning means providing a variable warning indication in response to the applied current whereby said warning means is responsive to a first predetermined amount of current traversing the warning means and the second gauge coil, auxiliary circuit means connected in shunt relation with said second coil, said auxiliary circuit means including a switch which is responsive to a second condition, said auxiliary circuit causing a second predetermined amount of current to be applied to said warning means when said switch is closed, and displaceable indicator means magnetically coupled to said gauge coils to be angularly displaced according to the ratio of current through the gauge coils, whereby an open circuit in the warning device disconnects said second gauge coil from the source and the indicator means assumes a predetermined position.

2. The combination defined by claim 1 wherein said auxiliary circuit means includes a negative temperature coefficient resistor means whereby the warning means persists in one warning indication state until the switch has been closed for a predetermined time.

3. A dual mode indicator comprising the combination of a source of potential, a lamp, an electromagnetic gauge coil and a continuously variable resistance potentiometer for regulating current through the gauge coil in accordance with a primary condition to be monitored, the lamp being connected between one terminal of the source and the gauge coil, auxiliary circuit means connecting the junction between the lamp and the gauge coil with the other terminal of the source, the auxiliary circuit means including a normally open switch and a delay means serially connected to said switch, said switch being responsive to a secondary condition to close when the secondary condition obtains, thereby connecting the auxiliary circuit means in shunt relation with the gauge coil and the potentiometer, the impedance of the auxiliary circuit means being substantially less than the impedance of the gauge coil whereby current through the lamp is substantially increased upon closing the auxiliary circuit after the predetermined time delay provided by said delay means.

4. In combination with an electrical gauge comprising a source of energizing potential, a first coil connected across the source, a series combination of a second coil and a continuously variable impedance also connected across the source, and a magnetic armature magnetically coupled to said first and second coils and rotatably mounted to be angularly displaced by the resultant flux field produced by the first and second coils: a current sensitive warning means for presenting at least two levels of warning indication, said warning means being connected in series between said source and said second coil, auxiliary circuit means connected between ground and the junction of the warning means and said second coil, said auxiliary circuit means including a normally open switch and a third coil, said switch being responsive to a selected condition to close thereby connecting the auxiliary circuit means in shunt relation with said second coil, said third coil producing a flux field which is magnetically coupled to said armature when said switch is closed to energize the third coil, the impedance of the parallel combination of said second coil and said auxiliary circuit including said third coil being substantially less than the impedance of said second coil.

5. In combination with an electrical gauge comprising a source of energizing potential, a first coil connected across the source, the series combination of a second coil and a continuously variable impedance also connected across the source, and a magnetic armature magnetically coupled to the first and second coils and rotatably mounted to be angularly displaced by the resultant flux field produced by the first and second coils: a current sensitive warning means for presenting at least two levels of warning indication, the warning means being connected in series with and interposed between the source and the first coil, auxiliary circuit means connected between ground and the junction of the warning means and the first coil, the auxiliary circuit means including a normally open switch which is responsive to a selected condition to close thereby connecting the auxiliary circuit means in shunt relation with the first coil, the impedance of the parallel combination of the first coil and the auxiliary circuit means being substantially less than the impedance of the first coil.

6. The combination as defined by claim 5 wherein the warning means comprises a lamp adapted to be illuminated to a degree according to the magnitude of current therethrough.

References Cited by the Examiner

UNITED STATES PATENTS

| 2,181,960 | 12/1939 | Bacon | 340—177 |
| 2,756,410 | 7/1956 | Tobias | 340—177 |
| 2,820,957 | 1/1958 | McDougal | 340—181 |

FOREIGN PATENTS

| 1,028,038 | 2/1953 | France. |

NEIL C. READ, *Primary Examiner.*

THOMAS B. HABECKER, *Examiner.*